UNITED STATES PATENT OFFICE.

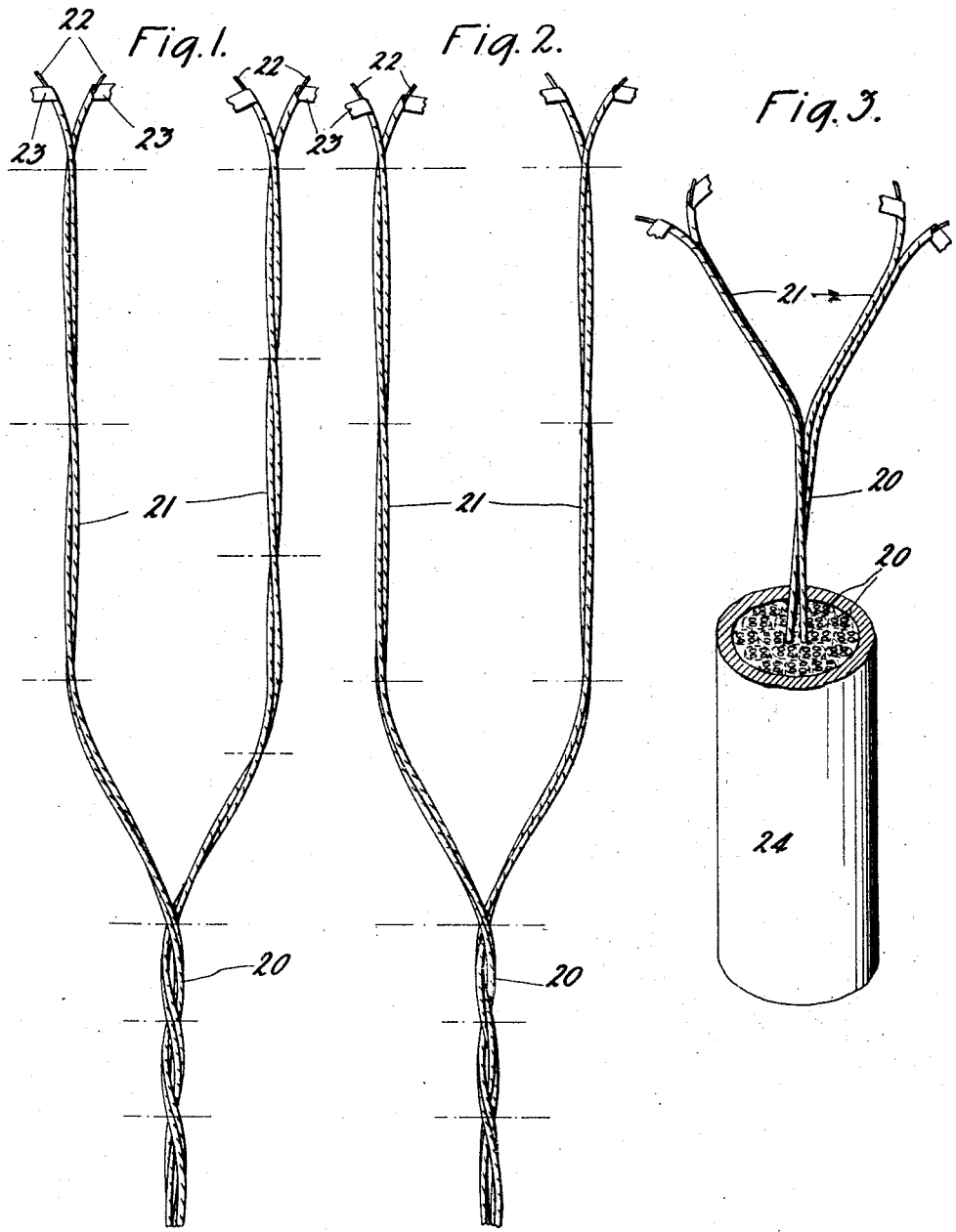

GUSTAVUS A. ANDEREGG, OF OAK PARK, AND WILBUR E. MOUGEY, OF CHICAGO, ILLINOIS, ASSIGNORS TO WESTERN ELECTRIC COMPANY, INCORPORATED, OF NEW YORK, N. Y., A CORPORATION OF NEW YORK.

TELEPHONE AND TELEGRAPH CABLE.

1,277,025.  Specification of Letters Patent.  Patented Aug. 27, 1918.

Original application filed June 30, 1916, Serial No. 106,808. Divided and this application filed September 14, 1917. Serial No. 191,368.

*To all whom it may concern:*

Be it known that we, GUSTAVUS A. ANDEREGG and WILBUR E. MOUGEY, citizens of the United States, residing at Oak Park, in the county of Cook and State of Illinois, and at Chicago, in the county of Cook and State of Illinois, respectively, have invented certain new and useful Improvements in Telephone and Telegraph Cables, of which the following is a full, clear, concise, and exact description.

This invention relates to telephone and telegraph cables, and is a division of our copending application, Serial No. 106,808, filed June 30, 1916.

In such cables, a pair of conductors is formed by twisting together two insulated conductors, and when two such pairs are twisted together, there is formed what is known as a "quad". Each pair of conductors in such a quad constitutes a side circuit or physical circuit, while each pair of conductors in parallel forms one side of a phantom circuit. The twist by which two conductors are combined to form a pair is called a pair twist, and the twist by which two pairs are combined to form a quad is called a quad twist. Cables containing one or more quads, with or without additional conductors, are known as duplex cables, and those containing no quads are known as non-duplex cables.

The object of this invention is the production of duplex cable exhibiting substantial improvements in the electrical characteristics thereof, thereby resulting in the production of cable highly efficient in the transmission of electrical impulses over the conductors therein.

Preferably, this is accomplished by employing quads having quad twists shorter than the twists of one or both of the pairs forming the respective quads, and proportioning the lengths of twist or lengths of lay of the quads and pairs, so that the mutual capacity of both the pair and phantom circuits, and the capacity unbalance between the pairs in the same quad and between circuits in adjacent quads, are greatly decreased.

The two pairs of a quad may be twisted in the same direction or in reverse direction to each other. Also the quad twists may be in same direction or in reverse direction to one or both of the pair twists.

This invention will be more fully understood from the following description, reference being made to the accompanying drawing, wherein Figure 1 is a view of a quad having the same direction of pair and quad twists; Fig. 2 is a view of a quad composed of pairs which are twisted in reverse directions, and Fig. 3 is a view in perspective of a multi-conductor cable, one quad of which is shown extending from the end thereof.

As shown in the drawings, the quads 20 are formed by twisting together two pairs 21, each of which is composed of two conductors 22 of any desired gage. The conductors are preferably of copper and are commonly covered with paper insulation 23 applied in any suitable manner. In Fig. 3 is shown a plurality of quads 20 arranged in core or cable form and inclosed in a cylindrical lead sheath 24.

It is generally recognized in the manufacture of non-duplex cable that it is desirable from a transmission standpoint to have adjacent pairs of different lengths of twist. In the manufacture of duplex cable, the two pairs forming a quad may or may not have different lengths of twist. However, when the two pairs of a quad have the same lengths of twist, it is essential that the two pairs be twisted in reverse directions, that is, one pair of the quad should be twisted in a right-hand direction and the other pair of the quad should be twisted in a left-hand direction. The quad twists of adjacent quads should in all cases be of different lengths regardless of the relative lengths of the pair twists. This invention contemplates cables in which adjacent quads have different lengths of quad twists, the pairs in adjacent quads having different lengths of twists and the pairs of the same quad having the same or different lengths of twist.

The mutual capacity of pairs and phantoms depends to a large extent upon the lengths of pair and quad twists used. In general, for a given number of quads, of a given gage of wire, within a given size sheath, lower mutual capacity of pairs and phantoms can be obtained with long twists than with short twists.

When very long pair twists are used with quad twists of moderate length, the mutual capacities of both pairs and phantoms are, in general, reduced by this lengthening of the pair twists. Lengthening of the quad twists alone, however, does not necessarily reduce the mutual capacity of the pairs. In fact, in many conditions, lengthening of the quad twists increases the mutual capacity of the pairs.

The unbalance and the resulting crosstalk between a circuit in one quad and a circuit in an adjacent quad is, in general, increased if the twists of the circuits involved are lengthened. It is especially true that the unbalance and the resulting crosstalk between a phantom circuit and a circuit in an adjacent quad is increased if the length of the quad twist is increased. The unbalance and the resulting crosstalk between a pair in one quad and a circuit in an adjacent quad is much less subject to increase with increased length of pair twists. In addition, the unbalance and the resulting crosstalk between circuits in adjacent quads are, in general, greatest if the two circuits are phantoms and least if the two circuits are pairs. The unbalance involving a phantom circuit of one quad and a physical circuit of an adjacent quad, is in general intermediate in magnitude between that involving two phantom circuits and that involving two physical circuits.

From the facts as above set forth it will be seen that there is generally a greater improvement produced in mutual capacity by lengthening the pair twists than by lengthening the quad twist. It is also seen that lower unbalance and crosstalk are produced with lengthened pair twists than with lengthened quad twist. It will therefore be seen that both from the standpoint of mutual capacity, and from the standpoint of capacity unbalance and crosstalk, it is preferable to lengthen the pair twists rather than to lengthen the quad twist.

An extended series of experiments has conclusively proven that duplex cables made up in accordance with this invention exhibit a substantial improvement in mutual capacity of both pairs and phantoms, together with very low unbalance between the two pairs in the same quad and low unbalance between circuits in adjacent quads.

What is claimed is:

1. A group of four insulated conductors consisting of two pairs helically twisted together to form a quad, having pair twists longer than the quad twists and the quad being twisted in the same direction as one of the pairs.

2. A group of four insulated conductors consisting of two pairs twisted in reverse directions and about each other to form a quad, one of said pairs having twists longer than the quad twists.

In witness whereof, we hereunto subscribe our names this sixth day of September A. D., 1917.

GUSTAVUS A. ANDEREGG.
WILBUR E. MOUGEY.